Dec. 12, 1950 G. SIMMONS, JR 2,533,966
METHOD AND APPARATUS FOR SEPARATING ISOTOPES
Filed Aug. 6, 1945 3 Sheets-Sheet 1
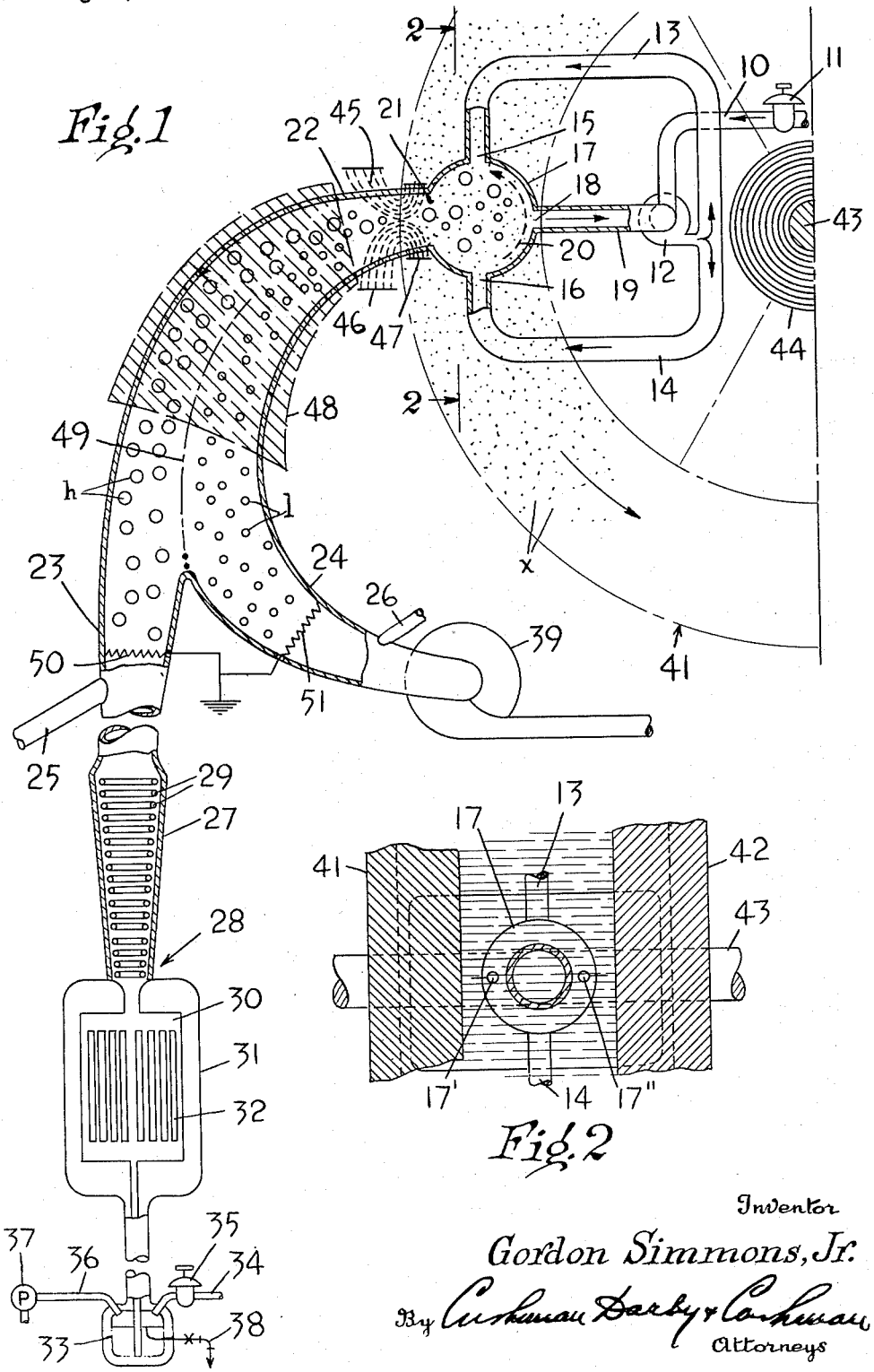
Inventor
Gordon Simmons, Jr.
By Cushman Darby & Cushman
Attorneys

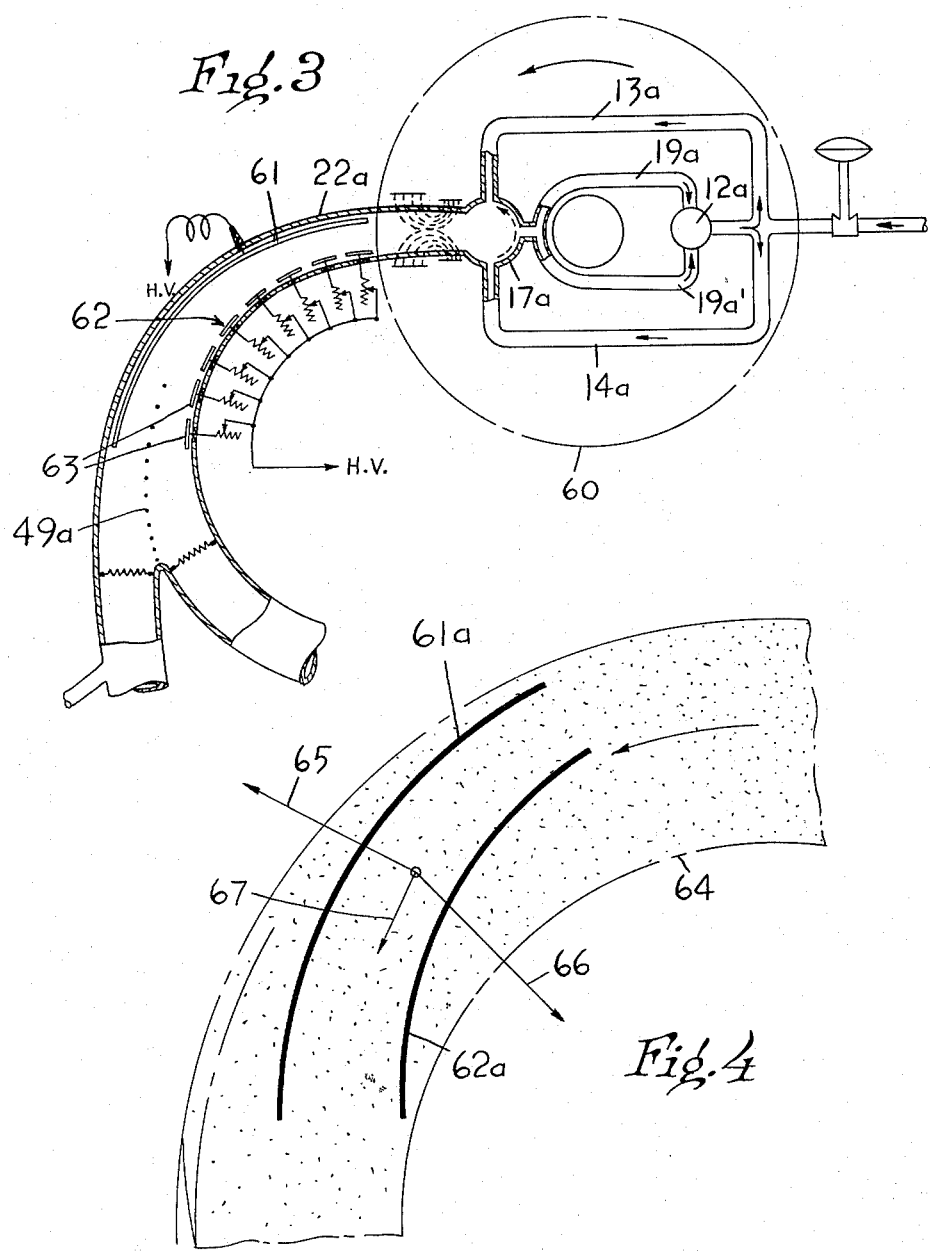

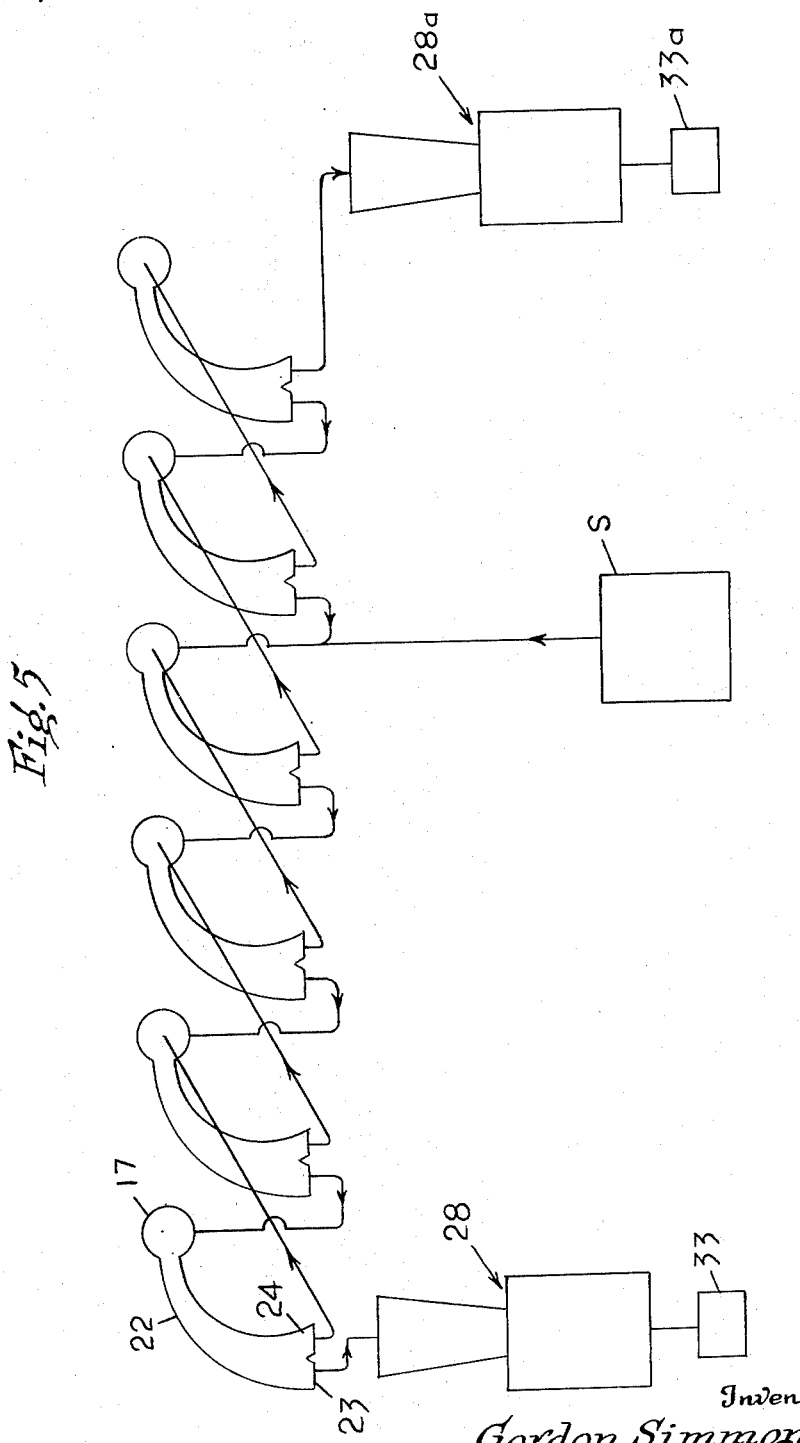

Patented Dec. 12, 1950

2,533,966

UNITED STATES PATENT OFFICE 2,533,966

METHOD AND APPARATUS FOR SEPARATING ISOTOPES

Gordon Simmons, Jr., Portageville, Mo.

Application August 6, 1945, Serial No. 609,221

9 Claims. (Cl. 250—41.9)

This invention relates to the separation of elementary particles of extremely small size and of different mass.

More specifically this invention relates to the treatment of gaseous isotopic elements for the separation of the heavy and light atoms thereof in a commercially successful manner.

Heretofore the treatment of an isotopic element to separate its isotopes has been little more than a laboratory experiment generally conducted with the aid of a mass spectrometer for the determinaton of atomic weights of the isotopes of which many elements are comprised.

A well known example of such an element is represented by neon. The parent element is composed of atoms having atomic weight 20, 21 and 22. The parent element has an apparent atomic weight of 20.183 and is composed of the three isotopes as follows: atomic weight 20, 90%; atomic weight 21, 0.27%; atomic weight 22, 9.73%.

It is therefore the purpose of this invention to produce a pure isotope or to increase the normal concentration of a particular isotope in any given isotopic element.

Minute quantities of various isotopes have been produced in the laboratory by means of the mass spectrometer. Such separations were of no commercial importance and served only as a basis for scientific investigation.

It follows, therefore, that isotopes are quite rare and inasmuch as they have very definite practical and experimental uses are considered extremely valuable.

It is an object of the present invention to provide method and means for the separation of isotopes, based on the small difference in mass of the different atoms of which the isotopic element is comprised, by the actions of magnetic or electrostatic fields on ionized particles of the isotopic elements to produce motion of the charged particles in predetermined directions.

Another object of this invention is to provide an apparatus for efficiently effecting the separation of isotopes in a continuous manner and in large enough quantities such as to render such separation commercially successful.

Figure 1 is a view, partly in section, of apparatus designed to carry out the method of this invention, Figure 2 is a cross section substantially on line 2—2 of Figure 1, Figure 3 is a view, partly in section, of a modified type of apparatus for effecting the separation of isotopes, Figure 4 is a fragmentary view illustrating the manner in which combined electrostatic and magnetic fields may be used to effect separation of isotopes, and Figure 5 is a flow diagram showing a number of separators arranged substantially serially to effect a high degree of separation.

Referring to Figures 1 and 2, reference numeral 10 designates a pipe leading from a source of isotopic gas or vapor, comprising relatively light and heavy atoms or ions $l$ and $h$, through a pressure control valve 11. Conduit 10 leads to the intake of a circulating device such as a pump 12 whose output is branched to two conduits 13 and 14 which extend to opposed inlet openings 15 and 16 of an ionizing chamber 17 equipped with any suitable ionizing facilities such as the electrodes 17' and 17" which appear in Figure 2.

Midway between inlet openings 15 and 16, as here shown, the ionizing chamber has an outlet 18 connected by a conduit 19 with the feed conduit 10 at the pump intake, reference numeral 20 designating a grid disposed in chamber 17 in front of outlet 18. Opposite outlet 18 chamber 17 has an outlet opening 21, here shown as of larger area than opening 18, the opening 21 being at one end of an arcuate casing 22 which expands in area away from the top opening and is branched into separate diverging arms 23 and 24.

Reference numeral 25 designates a pipe leading from arm 23 to an analytical device, such as a mass spectrometer, and a similar pipe 26 may be lead from arm 24. Beyond take-off pipe 25, arm 23 joins a pre-cooling chamber 27 of a condenser 28, the chamber being equipped with internal cooling coils 29 and tapering in substantial correspondence with the rate of contraction of gases flowing therethrough. Reference numeral 30 designates a condensing chamber in connection with chamber 27 disposed within a refrigerating jacket 31 and containing refrigerating coils 32, the jacket being extended to surround a receiver 33. The receiver may be connected with a source of dry inert gas through a supply pipe 34 under control of a pressure regulating valve 35 to enable purging of the receiver, and a pipe line 36 may extend from the receiver to a vacuum pump 37 to enable the evacuation of the receiver after purging. Reference numeral 38 designates a valved line leading to a shipping cylinder or the like.

Beyond take-off 26 arm 24 of casing 22 goes to the intake of a vacuum pump 39 which serves to maintain the interior of the casing and ionizing chamber at the desired low pressure, the pump delivering to disposal.

Reference numerals 41 and 42 designate magnetic wheels or discs having opposed thickened rim portions between which the ionizing chamber 17 is disposed. The discs are mounted on a shaft 43 around which is disposed a magnetizing coil 44. When the discs are magnetized from coil 44, and are rotated, the ionized particles $l$ and $h$ in chamber 17 are subjected to a rotating magnetic field whose lines of force are perpendicular to the wheel faces, as indicated by the dots X in Figure 1 or broken lines in Figure 2, the field acting to expel ionized particles from chamber 17 in a direction normal to the direction of movement of the field. This means that ionized particles are projected with substantial velocity through opening 21 into casing 22. Grid 20 is biased with the same polarity as the ionized particles and hence contributes to the propelling effect. This action of the grid may be controlled by controlling the strength of the biasing potential. Unionized particles are free to pass through the grid for circulation back to the inlet openings.

Reference numeral 45 designates a focusing field at the inlet of casing 22, this field being developed between annular rings 46 and 47 subjected to high potential, or the focusing field may be magnetic. The focusing field serves to direct the ions into casing 22 in a uniform stream.

Beyond the focusing field 45 casing 22 is in a magnetic field of force 48 whose lines are perpendicular to the sheet, the same as in the case of the rotating field. When ionized particles, traveling in a predetermined path, are subjected to the lines of force of such a field, they are deflected laterally out of said path an extent depending upon the strength of the field, the velocity of the particles, the charge on the particles, and their mass. Since the field, charge, and velocity are factors capable of being maintained substantially contant, it will be seen that the degree of deflection of the ionized particles can be made proportional to their mass. Hence the light particles $l$ of smaller mass traveling through the casing are deflected to a greater extent than the particles $h$ of greater mass or, in other words, the heavier particles travel in an arc greater than the arc in which the lighter particles travel.

This deflection has the effect of separating the charged particles projected through the casing into divergent streams of which the stream of heavier particles passes into casing arm 23 while the stream of lighter particles passes into the casing arm 24. The state of separation may be maintained or promoted by means of a selector grid 49 positioned inside casing 22 and extending from between arms 23 and 24 back toward the point of initial separation of the charged particles so that the streams of heavy and light particles pass on opposite sides of the grid. The grid may be constituted by a curved screen connected with a source of potential which is controlled in any suitable manner and has a polarity like that of the ionized particles traveling in the streams so as to repel the said particles oppositely. The grid thereby directs and guides the separated streams so that the two pass cleanly into the outlet arms. In Figure 1, it is assumed that heavier particles are to be collected and consequently, these are delivered to the condenser. Obviously, if it were desired to retain the lighter particles, arm 24 would be connected to the condenser, or both arms could be connected to condensers.

Reference numeral 50 designates a deionizing grid in arm 23 and reference numeral 51 a similar grid in arm 24. It is the function of the deionizing grids to effect a union of electrons, freed from the atoms by ionization, with the positively charged particles so as to more or less restore the isotopic gas, resulting from the treatment, to its natural condition.

The isotope entering the condenser is first precooled in chamber 27, which as above stated, has a cross sectional area decreasing in consonance with the contraction of the gas being cooled, the gas being then liquefied in chamber 30 and flowing to the receiver 33 in which it accumulates until such time as the weight thereof plus the pressure acting thereon balances or exceeds the pressure maintained in the receiver, it being understood that the receiver may be at atmospheric pressure or higher. The condensate collected in the receiver may be drawn off as desired through line 38 into shipping drums of the type employed for the storage or transportation of liquid gas.

In the Figure 3 embodiment, the center of rotation of the magnetic field 60 lies on the opposite side of the ionizing chamber 17a from the casing 22a in line with its inlet and serves to propel the ionized particles into the casing 22a. In this embodiment of the invention, however, the particles, after leaving the rotating field, are caused to travel between charged plates 61 and 62. One of the plates 62 may be composed of individual elements 63 individually connected with a source of potential through suitable rheostats so that the charge thereon and consequently the strength of the electrostatic field set up between the plates may be varied as desired.

The electrostatic field set up between the plates 61 and 62 exerts a lateral deflecting force on the ionized particles traveling therein so that the particles of relatively light mass are deflected to the greatest extent toward the plate 62 while those of relatively greater mass are deflected to a lesser extent.

Thus, it will be seen that the stream of ionized particles flowing through the casing is again separated into divergent branches with each branch comprising ionized particles of like mass. If desired, a selector grid 49a may be employed to maintain and/or increase the divergence of the streams of ionized particles issuing from between the condenser plates and to guide and direct the separated branches into the outlets of the casing in the manner previously described.

The selector grid may likewise be composed of individual elements spaced from the charged plates toward the outlets of the casing so that the repelling force of the individual elements of the grid on the particles flowing in the separated branches at opposite sides thereof may be controlled as desired.

In the diagram illustrated in Figure 4, the condenser plates 61a and 62a act on the stream of charged or ionized particles flowing therebetween simultaneously with the action of a rotating magnetic or electrostatic field 64.

As clearly shown in Figure 4, the electrostatic field set up by the condenser plates 61a and 62a exerts a substantially lateral outward (or inward) component 65 upon the charged particles while the rotating magnetic field exerts a substantially radially inward (or outward) component 66 on the charged particles.

These two forces are resolved into a resultant motion of the particles in the direction of the outlets with the charged particles of different mass traveling in diverging paths.

In this case, it is to be understood that the selector grid may also be employed to effect further divergence and a more positive separation of the ionized particles as they leave the zones of influence of the combined fields.

The Figure 5 embodiment illustrates the manner in which the separating devices of this invention, for example those of Figure 1, may be connected in a battery to effect an unusually high efficiency of separation. As herein shown, the unwanted component of the isotopic element being acted upon is successively circulated through all of the devices from the left to the right of the battery, while the desired component is circulated through all of the devices from the right to the left of the battery together with a predetermined volume of untreated gas or vapor from the source S which may be connected to the ionizing chamber of one of the devices near the right hand side of the battery as shown.

The device at the left end of the battery thus delivers the heavy atom component to storage through the condenser and liquifier hereinbefore described, and the device at the right end of the battery may discharge the unwanted lighter atom component for waste. If desired, however, and as shown, a condenser and liquefier arrangement 28a, 33a may also be provided for the lighter atom component so that either or both components, if wanted, may be collected for storage.

While not shown in the diagram it will be understood that suitable pumps may be connected with the outlet devices in the battery to maintain their pressure at a substantially low level while admittance of gas to the inlets of the devices is, of course, controlled by suitable differential pressure regulating valves in a well-known manner. Preferably, the pressure of the devices decreases toward the left end of the battery; or towards the ends of the battery where the final products of separation are delivered to storage so that the efficiency of separation increases proportionally to the decrease in pressure.

From the above it will be evident that the invention makes isotopes available on a commercial scale in the use of relatively simple apparatus. The invention is, of course, not limited to details of apparatus and procedure herein disclosed, but extends to variations in these matters comprehended within the claims which follow.

I claim:

1. The method of separating elementary particles of different mass which comprises: ionizing said particles; subjecting the ionized particles to a magnetic field moving relative to said ionized particles so as to induce motion of said ionized particles in a predetermined direction normal to the lines of force of said field and with substantial velocity; subjecting the charged particles thus set in motion to a second field of force so as to deflect the ionized particles and thereby cause particles of one mass to travel in one arcuate path and particles of another mass to travel in another arcuate path divergent from said first mentioned path; de-ionizing the charged particles traveling in at least one of said paths, and collecting said de-ionized particles.

2. The method of continuously separating elementary particles of different mass in a common fluid substance which comprises: continuously delivering quantities of said fluid to an ionizing chamber at relatively low pressure to effect ionization of said particles of different mass; subjecting said ionized particles to a magnetic field of substantial intensity moving relative to said ionized particles so as to impart motion to the ionized particles in a predetermined direction normal to the lines of force of said field; subjecting said charged particles moving in said predetermined path to a second field of force to effect a deflection of said moving charged particles into separate curved paths whose curvature is mathematically related to the mass of the said particles; repelling the streams of charged particles traveling in said separated paths away from each other to effect further diversion of said paths and to prevent intermingling of particles of the different streams; de-ionizing the charged particles traveling in at least one of said separated paths; and collecting the de-ionized particles.

3. The method of separating elementary particles of different mass which comprises: ionizing said particles; subjecting said ionized particles to a magnetic field moving relative to said ionized particles to effect motion of said ionized particles in a predetermined path normal to the lines of force of said field; subjecting the ionized particles moving in said predetermined path to an electrostatic field to effect a deflection of the ionized particles an amount depending upon the ratio of their charge to their mass so as to produce divergent streams of ionized particles with each stream comprising ionized particles of like mass; physically separating said divergent streams; de-ionizing the particles traveling in at least one of said separated streams; and collecting the de-ionized particles.

4. The method of separating elementary particles of different mass which comprises: ionizing said particles; and subjecting said ionized particles to a magnetic field rotating about a fixed axis and to an electrostatic field curved eccentrically to the axis of rotation of the magnetic field with the lines of force of said fields cutting across each other and acting in opposition to one another on the ionized particles so as to cause a resultant motion of the particles in a predetermined direction with ionized particles of different mass separating into individual streams diverging with respect to each other upon travel of the particles through said fields; de-ionizing the charged particles traveling in at least one of said streams; and collecting said de-ionized particles.

5. The method of separating elementary particles of different mass, which comprises: ionizing said particles; subjecting said ionized particles to a magnetic field rotating about a fixed axis and to an electrostatic field curved eccentrically to the axis of rotation of the magnetic field with the lines of force cutting across each other and substantially acting in opposition to one another on the ionized particles so as to cause resultant motion of the particles in a predetermined direction with ionized particles of different mass separating into individual streams diverging with respect to each other upon travel of the particles through said fields; exerting a repelling force simultaneously on the charged particles traveling in said diverging streams from a point therebetween to prevent intermingling of said streams; de-ionizing the charged particles traveling in at least one of said streams; and collecting said de-ionized particles.

6. An apparatus for separating elementary particles of different mass from a fluid, such as an isotopic gas, comprising: a casing having an inlet and a pair of outlets; an ionizing chamber communicating with the inlet of said casing and into which fluid containing elementary particles of different mass is adapted to be continuously delivered for ionization; vacuum means for maintaining said casing at a relatively low pressure; means providing a field of force which acts on the ionized particles in said ionizing chamber in a direction such as to induce motion of the charged particles into the casing towards its outlets; means between the inlet and outlets of the casing for exerting a deflecting force on the charged particles traveling therethrough for deflecting said particles laterally an amount depending upon their mass so that charged particles of lesser mass are deflected more than charged particles of greater mass, said deflecting means dividing the particles traveling through the casing into divergent streams with each stream comprising ionized particles of like mass; and means disposed between said divergent streams in which the ionized particles travel for maintaining divergence of said streams and for directing said streams respectively into said outlets.

7. An apparatus for separating elementary particles of different mass from an isotopic gas comprising: a casing having an inlet and a pair of outlets; means at the inlet of said casing for ionizing isotopic gases entering the casing; means for maintaining said casing at a relatively low pressure so as to facilitate ionization of the gases entering the same; a rotating magnetic field providing a field of force which acts on the ionized particles of the gases at the inlet of the casing in a direction such as to induce motion of said ionized particles through the casing from its inlet to its outlets; means for exerting a lateral deflecting force on the ionized particles traveling through the casing to cause deflection of the same out of their normal paths of travel an amount depending upon the mass of the particles whereby the charged particles traveling through the casing are divided into divergent streams with each stream comprising particles of like mass; a selector grid inside the casing extending from a point between the two outlets of the casing toward the inlet of the casing and dividing the portion of the casing adjacent its outlets into two branches; means for charging said selector grid with a predetermined potential and with a polarity the same as that of the charged particles traveling in said divergent streams so as to maintain separation of said streams, said casing being so shaped as to cooperate with said grid to guide said streams of charged particles into said outlets respectively; and means in at least one of said outlets for de-ionizing the isotope flowing through one of said outlets.

8. In an apparatus for separating elementary particles of different mass from an isotopic gas: a casing having an inlet and two outlets; an ionizing chamber for said gas at the inlet of the casing for effecting ionization of the gas prior to its entry into the casing; means acting upon the ionized gas in said chamber for effecting motion of the charged particles of different mass thereof into and through the casing with particles of different mass traveling in separate paths divergent from each other; a selector grid at the outlet end of the casing projecting between the divergent streams of charged particles traveling through the casing for directing each of said streams into one of said outlets of the casing, said selector grid comprising a series of separate elements individually connected with a source of potential such that the charge on said elements may be independently varied in intensity so that said particles in their respective streams are repelled to opposite sides of the grid with a force depending upon the charge on the separately charged elements and means in at least one of said outlets for de-ionizing the charged particles entering the same.

9. The method of continuously separating elementary particles of different mass from a fluid which comprises ionizing said particles; subjecting the ionized particles to a magnetic field which moves relative to the ionized particles so as to induce movement of the particles at a substantial velocity in a predetermined direction normal to the lines of force of the magnetic field; continuously delivering additional quantities of the fluid into the ionized zone to replace the particles moved out of the zone by relative movement of the magnetic field; subjecting the charged particles set in motion by the magnetic field to a second field of force which deflects the ionized particles, causing particles of one mass to travel in one arcuate path and the particles of another mass to travel in another arcuate path divergent from said first-mentioned path; collecting the charged particles traveling in said separate paths, continuously passing collected particles from one path to a zone for subjection to a relatively moving magnetic field and repeating the separation process aforesaid upon this portion of particles; likewise passing the other portion of collected particles to a zone for subjection to a relatively moving magnetic field and subjection to a separation operation as aforesaid; de-ionizing the charged particles traveling in at least one of said paths of said separation stages and collecting said de-ionized particles.

GORDON SIMMONS, Jr.

REFERENCES CITED

The following references are of record in the file of this patent:

UNITED STATES PATENTS

| Number | Name | Date |
|---|---|---|
| 1,948,384 | Lawrence | Feb. 20, 1934 |
| 1,950,008 | Mutscheller | Mar. 6, 1934 |
| 2,102,045 | Thomas | Dec. 14, 1937 |
| 2,206,634 | Fermi et al. | July 2, 1940 |
| 2,355,658 | Lawlor | Aug. 15, 1944 |
| 2,356,404 | Heller | Aug. 22, 1944 |
| 2,427,484 | West | Sept. 16, 1947 |

OTHER REFERENCES

Bleakney, American Physics Teacher, February 1936, vol. 4, pages 12-17.